US010323780B1

(12) United States Patent
Stearns

(10) Patent No.: US 10,323,780 B1
(45) Date of Patent: Jun. 18, 2019

(54) ORBITAL COUPLING ARRANGEMENT

(71) Applicant: Stedlin Mfg., Inc., Duluth, MN (US)

(72) Inventor: Frank Arthur Stearns, Superior, WI (US)

(73) Assignee: Stedlin Mfg., Inc., Duluth, MN (US)

( * ) Notice: Subject to any disclaimer, the term of this patent is extended or adjusted under 35 U.S.C. 154(b) by 0 days.

(21) Appl. No.: 15/958,670

(22) Filed: Apr. 20, 2018

Related U.S. Application Data

(60) Provisional application No. 62/596,281, filed on Dec. 8, 2017.

(51) Int. Cl.
*F16L 27/047* (2006.01)

(52) U.S. Cl.
CPC .................... *F16L 27/047* (2013.01)

(58) Field of Classification Search
CPC ......... F16L 27/06; F16L 27/04; F16L 27/047; F16L 27/023; F16L 27/02; F16L 47/18
USPC ....... 285/118, 146.1, 146.2, 146.3, 261, 263, 285/270, 271
See application file for complete search history.

(56) References Cited

U.S. PATENT DOCUMENTS

| | | | | |
|---|---|---|---|---|
| 2,971,701 | A | * | 2/1961 | Shames ...................... 285/261 X |
| 5,149,146 | A | * | 9/1992 | Simoni .................... F16L 27/04 285/146.1 |
| 2003/0156893 | A1 | * | 8/2003 | Takagi .................. F16L 27/023 |
| 2008/0284165 | A1 | | 11/2008 | Chiang |
| 2015/0001842 | A1 | * | 1/2015 | Jones .................... F16L 27/047 285/261 |
| 2017/0350543 | A1 | * | 12/2017 | Lillmars ............... F16L 27/047 |

FOREIGN PATENT DOCUMENTS

| | | |
|---|---|---|
| EP | 0 087 401 A1 | 8/1983 |
| JP | H06109177 | * 4/1994 |
| JP | 9-273681 A | 10/1997 |

OTHER PUBLICATIONS

International Search Report and Written Opinion for Application No. PCT/US2018/064461 dated Mar. 28, 2019.

* cited by examiner

*Primary Examiner* — Greg Binda
*Assistant Examiner* — Zachary T Dragicevich
(74) *Attorney, Agent, or Firm* — Merchant & Gould P.C.

(57) ABSTRACT

An orbital coupling arrangement. In one example, the orbital coupling arrangement includes a first connector part, an orbital member, and a seal member. The first connector part can define a central passageway and can include a first connection arrangement at a first end. The orbital member can define a spherical segment and an adjacent tubular segment that together define a central passageway extending between a first end proximate the spherical segment and a second end proximate the tubular segment. The seal member is in sealing contact with the orbital member spherical segment at a location between a geometric center of the spherical segment and the orbital member first end.

13 Claims, 17 Drawing Sheets

US 10,323,780 B1

ORBITAL COUPLING ARRANGEMENT

RELATED APPLICATIONS

This application claims priority to U.S. Provisional Patent Application Ser. No. 62/596,281, filed on Dec. 8, 2017, the entirety of which is hereby incorporated by reference.

BACKGROUND

Couplings are used in compressed air system to interconnect various system components, such as air compressors, piping, and end use devices, such as hand held tools. In some applications, it is desirable to have a coupling that provides more freedom of movement between system components than what is provided by a rigid connection. For example, an orbital coupling can be provided between a compressed air hose and a pneumatic tool to allow an operator to more easily manipulate the tool. Although swivel couplings are known, improvements are desired as many prior art swivel couplings do not provide a sufficient degree of relative movement, leak excessively, and/or require significant force to induce relative movement at the location of the orbital.

SUMMARY

Orbital coupling arrangements for use in fluid-carrying piping assemblies, for example compressed air piping assemblies, are disclosed.

In one example, the orbital coupling arrangement includes a first connector part, an orbital member, and a seal member. The first connector part can define a central passageway and can include a first connection arrangement at a first end. The orbital member can define a spherical segment and an adjacent tubular segment that together define a central passageway extending between a first end proximate the spherical segment and a second end proximate the tubular segment. The seal member is in sealing contact with the orbital member spherical segment at a location between a geometric center of the spherical segment and the orbital member first end.

In one example, an orbital coupling arrangement includes a retaining or lock ring or member that secures the orbital member to the first connector part.

In one example, the lock ring or member and the seal member are positioned on opposite sides of a geometric center of the orbital member spherical segment.

In one example, the orbital coupling arrangement includes a first connector part and a second connector part, wherein the orbital member defines a first spherical segment, a second spherical segment, and a tubular segment extending between the first and second spherical segments.

In one example, the orbital member is rotatably connected to and in sealing contact with the first and second connector parts such that that a central passageway defined by the orbital member is in fluid communication with central passageways defined by the first and second connector parts.

In one example, the orbital coupling arrangement includes a load ring or member disposed about and in surface contact with the orbital member, wherein the load ring or member defines a central opening having a diameter that is less than a diameter of the spherical segment, the load ring or member being in surface contact with the spherical segment.

In one example, the lock ring or member defines a central opening having a diameter that is less than a diameter of the spherical segment.

In one example, the lock ring or member is threaded onto the first connector part proximate the second end such that the orbital member is secured to and rotatable with respect to the first connector part and such that the spherical segment forms a seal with the seal member.

In one example, an orbital coupling arrangement is disclosed that includes a first connector part defining a central passageway and including a first connection arrangement at a first end and a second connection arrangement at a second end, an orbital member defining a spherical segment and an adjacent tubular segment that together define a central passageway extending between a first end proximate the spherical segment and a second end proximate the tubular segment, a seal member defining a longitudinal axis and forming a seal between the orbital member spherical segment and the first connector part, and a retaining member rotatably securing the orbital member to the first connector part, the retaining member being separable from the first connector part, wherein the retaining member and the seal member are positioned on opposite sides of a plane extending both orthogonally to the seal member longitudinal axis and through a geometric center of the orbital member spherical segment.

In one example, an orbital coupling arrangement is disclosed that includes a first connector part defining a first central passageway, a second connector part defining a second central passageway, an orbital member defining a tubular portion extending between a first spherical segment and a second spherical segment, the orbital member defining a third central passageway, a first seal member defining a first longitudinal axis and forming a seal between the orbital member first spherical segment and the first connector part, a second seal member defining a second longitudinal axis and forming a seal between the orbital member second spherical segment and the second connector part, a first retaining member rotatably securing the orbital member to the first connector part; and a second retaining member rotatably securing the orbital member to the second connector part.

In one example, an orbital coupling arrangement includes a first connector part defining a first central passageway, a second connector part defining a second central passageway, an orbital member defining a tubular portion extending between a first spherical segment and a second spherical segment, the orbital member defining a third central passageway, a first seal member defining a first longitudinal axis and forming a seal between the orbital member first spherical segment and the first connector part, a second seal member defining a second longitudinal axis and forming a seal between the orbital member second spherical segment and the second connector part, a first retaining member rotatably securing the orbital member to the first connector part, and a second retaining member rotatably securing the orbital member to the second connector part.

In one example, an orbital coupling arrangement includes a first connector part defining a first central passageway and including a first connection arrangement, a second connector part defining a second central passageway and including a second connection arrangement, an orbital member defining a first spherical segment, a second spherical segment, and a tubular segment extending between the first and second spherical segments, wherein the orbital member defines a third central passageway and is unitarily formed as a single component, wherein the orbital member is rotatably connected to and in sealing contact with the first and second connector parts such that that the third central passageway is in fluid communication with the first and second central passageways, wherein the first connector part can rotate relative to the second connector part at a first angle between a longitudinal axis of the first connector part and a longitudinal axis of the second connector part, the first angle being at least 60 degrees.

In some examples, the retaining member is a polymeric material. In some examples, the first and second retaining members are formed from a polymeric material.

In some examples, the retaining member is threaded onto the first connector part. In some examples, the first and second retaining members are respectively threaded onto the first and second connector parts.

In some examples, the first connector part includes a shoulder portion against which a face of the retaining member abuts.

In some examples, the retaining member includes a load ring and a separate lock ring, wherein the load ring is in direct contact with the orbital member spherical segment and the lock ring secures the load ring to the first connector part. In some examples, the first and second retaining members each include a load ring and a separate lock ring, wherein the load ring is in direct contact with the orbital member first or second spherical segment and the lock ring secures the load ring to the first or second connector part.

In some examples, the retaining member has a first interior surface having the shape of a spherical segment that is complementary to the shape of the orbital member spherical segment.

In some examples, the retaining member has a second interior surface opposite the first interior surface, the second interior surface extending at an oblique angle to a longitudinal axis of the retaining member.

In some examples, the first connector part defines a circumferential groove within which the seal member is partially disposed.

In some examples, the retaining member includes a tool engagement arrangement for receiving a tool configured to rotate and tighten the retaining member with respect to the first coupling part.

In some examples, the orbital member is a unitarily formed component.

In some examples, the first angle is at least 80 degrees. In some examples, the orbital member can rotate relative to the first connector part at a second angle between a longitudinal axis of the orbital member and the longitudinal axis of the first connector part, the second angle being at least 30 degrees. In some examples, the second angle is at least 40 degrees. In some examples, the orbital member can rotate relative to the first connector part at a second angle between a longitudinal axis of the orbital member and the longitudinal axis of the first connector part, the second angle being at least 30 degrees; and wherein the orbital member can rotate relative to the second connector part at a third angle between a longitudinal axis of the orbital member and the longitudinal axis of the second connector part, the third angle being at least 30 degrees. In some examples, the second and third angles are at least 40 degrees.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
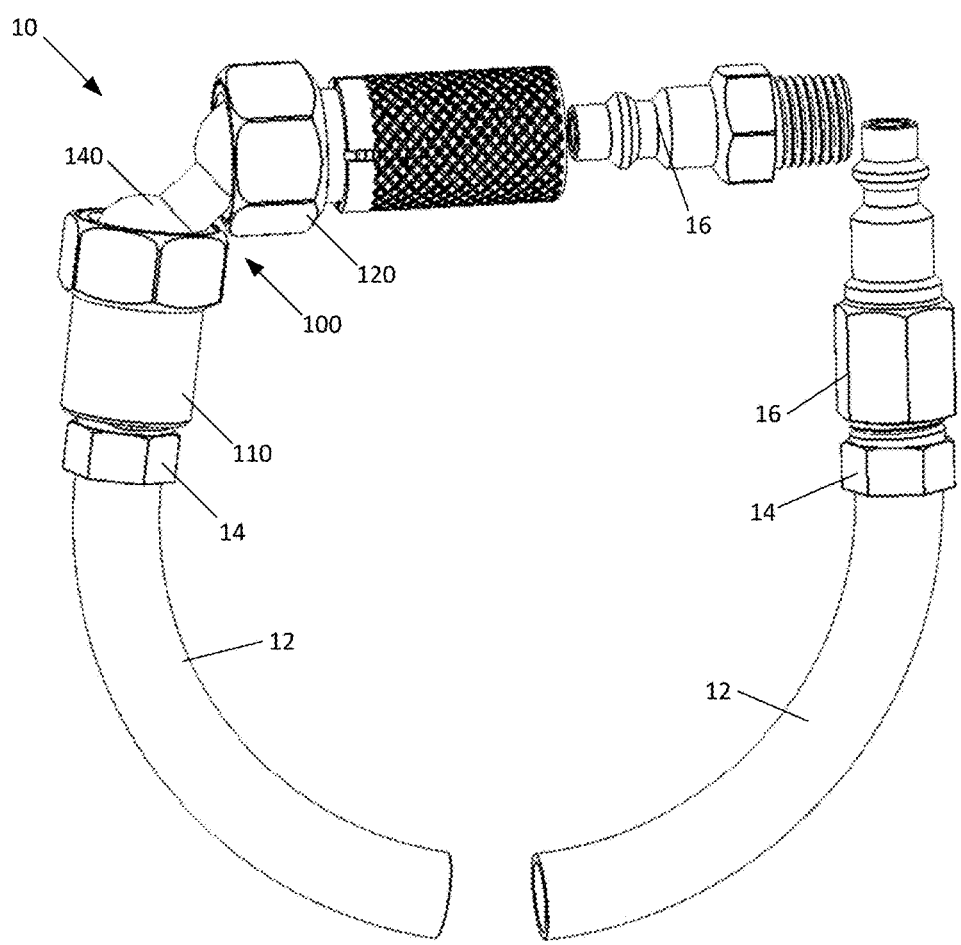
FIG. 1 is a schematic representation of a piping assembly having features in accordance with the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Figure 2:
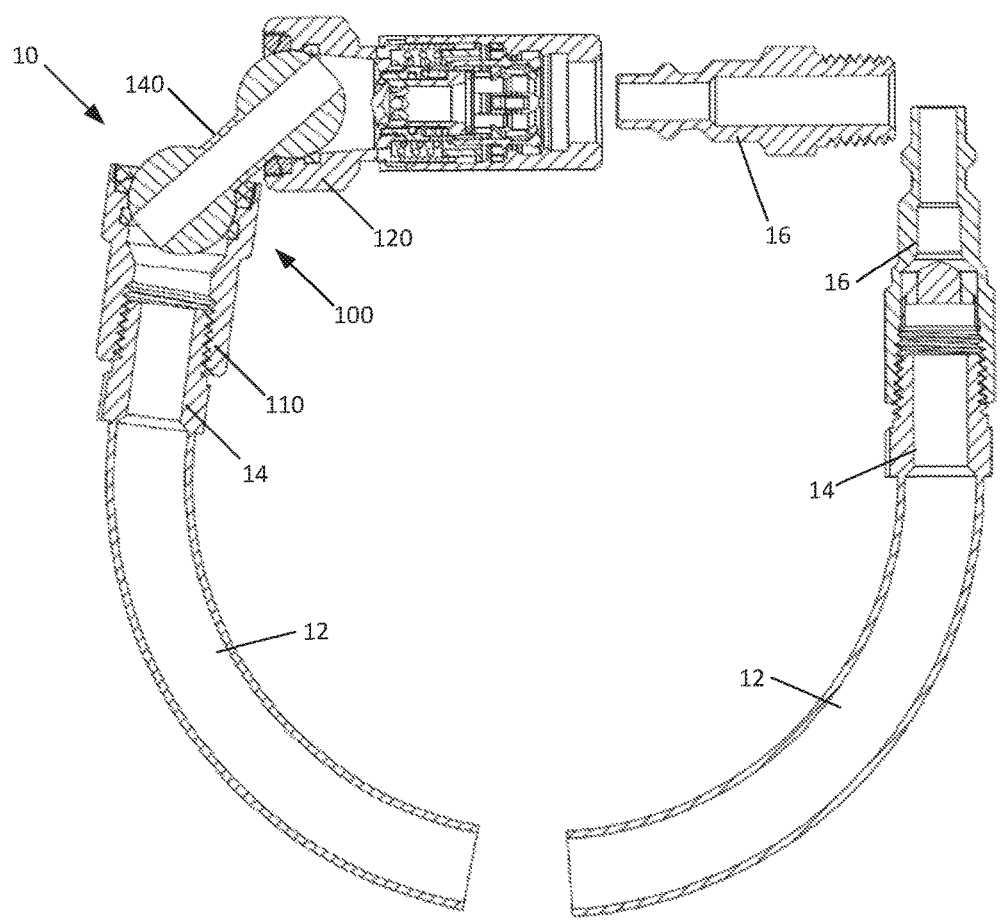
FIG. 2 is a cross-sectional view of the piping assembly shown in FIG. 1.

Referring to FIGS. 1 and 2, a piping assembly 10, including an orbital coupling arrangement 100, is presented. Although piping assembly 10 can be configured for other types of fluids (e.g. liquids), piping assembly 10 is shown as being configured for use with a gas, such as compressed air. As shown, the piping assembly 10 is shown as further including a compressed air line 12 having threaded male connectors 14 at each end. At one end, the threaded male connector 14 is connected to the orbital coupling arrangement 100. At the opposite end, the threaded male connector 14 is connected to a male quick connect fitting plug 16 for connection with a female quick coupler body (not shown). The orbital coupling arrangement 100 is also configured to accept a quick connect fitting plug 16. In one example, the compressed air line is a ⅜ inch hose, for example a Flexilla # HFZ3825YW2 hose manufactured by Legacy Manufacturing of Marion, Iowa. In one example, the threaded male connectors 14 include a first end with male threads and a second end with a barbed fitting, such as a Tru-Flate 21-143 ¼ NPT male fitting׳⅜ ID hose barb type fitting manufactured by Plews and Edelman of Dixon, Ill. In one example, the male quick connect fitting plug 16 is configured with male threads, such as a Milton M style plug with ¼ NPT threads manufactured by Milton Industries of Chicago, Ill. As many other variations in piping and fitting size and type are possible, the disclosure is not limited to the specific configuration of fittings and piping shown.

In one aspect, the orbital coupling arrangement 100 includes a first connector part 110 and a second connector part 120. The first and second connector parts 110, 120 are rotatably connected together by an orbital member 140. The orbital member 140 may also be referred to as a swivel member 140. The orbital member 140 can be either a plastic part or a metal part. In one aspect, the orbital member 140 is retained to the first and second connector parts 110, 120 by a load ring or member 150 and a lock ring or member 160 provided at each end of the orbital member 140. A seal member 170 is also provided at each end of the orbital member 140 such that a seal is formed between the orbital member 140 and the first and second connector parts 110, 120.

Figure 9:
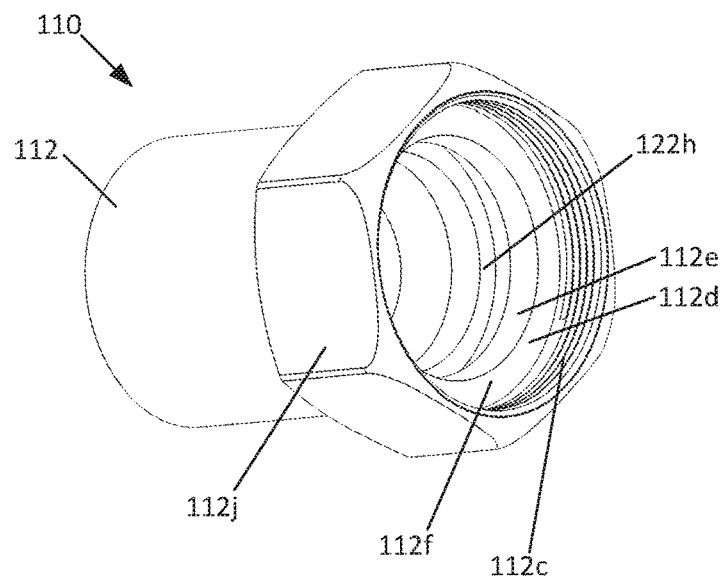
FIG. 9 is a perspective view of the first coupling member of the orbital coupling arrangement shown in FIG. 3.
Figure 10:
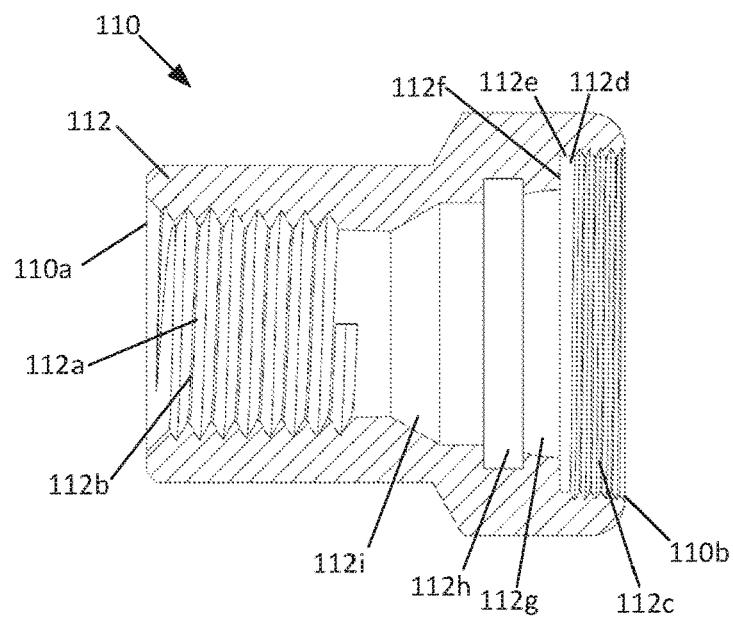
FIG. 10 is a cross-sectional view of the first coupling member shown in FIG. 9.

The first connector part 110 is shown in isolation at FIGS. 9-10. In one aspect, the first connector part 110 extends between a first end 110a and a second end 110b. The first connector part 110 is shown as being formed as a unitary main body 112 and can be a machined or molded, plastic or metal component. The main body 112 defines an internal passageway 112a extending between the first and second ends 110a, 110b.

Figure 31:
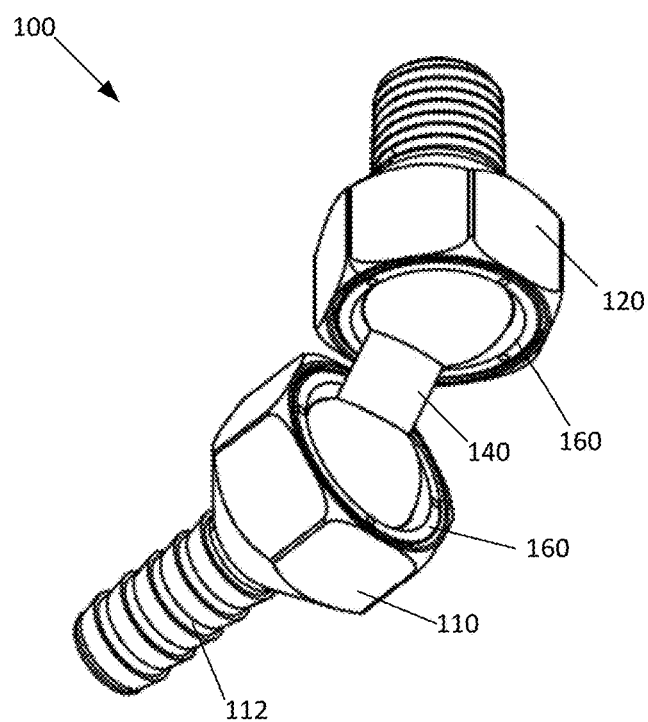
FIG. 31 is a perspective view of a third example of an orbital coupling arrangement usable in a compressed air system of the type shown in FIG. 1.
Figure 32:
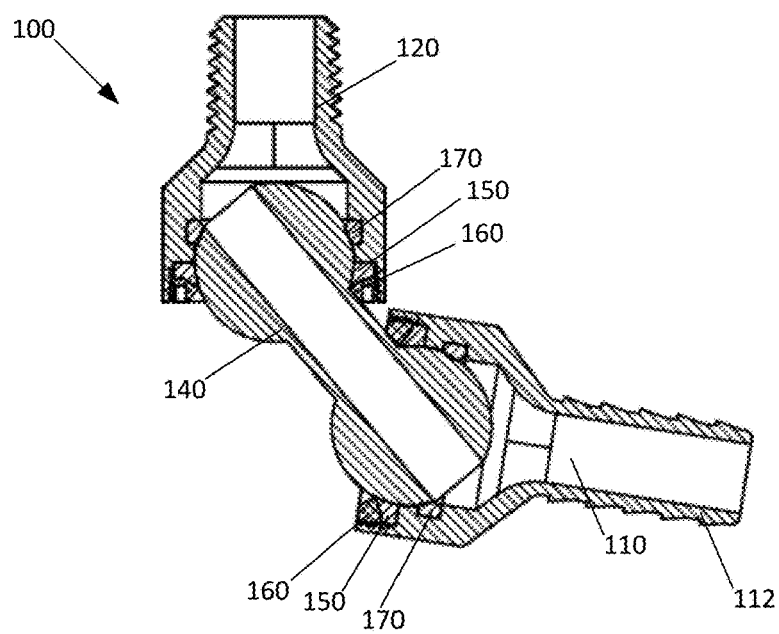
FIG. 32 is a cross-sectional view of the orbital coupling arrangement shown in FIG. 31.
Figure 33:
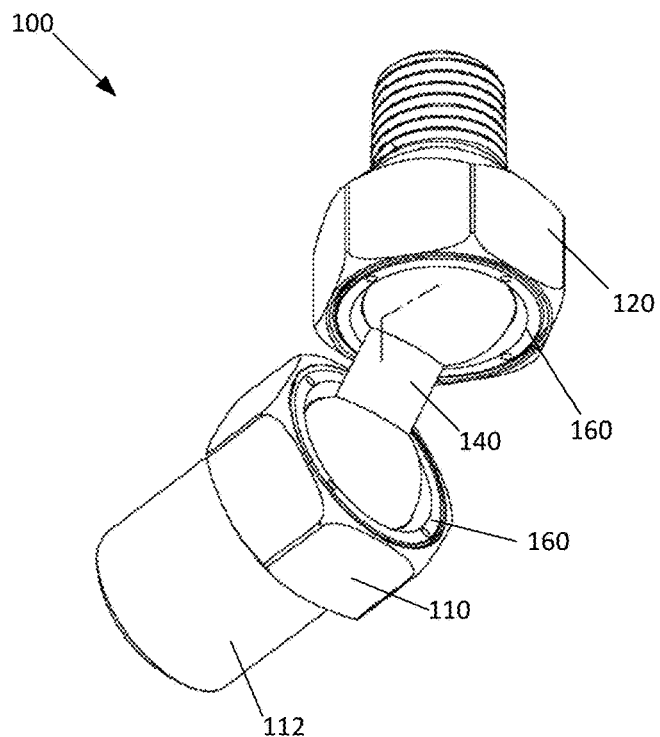
FIG. 33 is a perspective view of a fourth example of an orbital coupling arrangement usable in a compressed air system of the type shown in FIG. 1.
Figure 34:
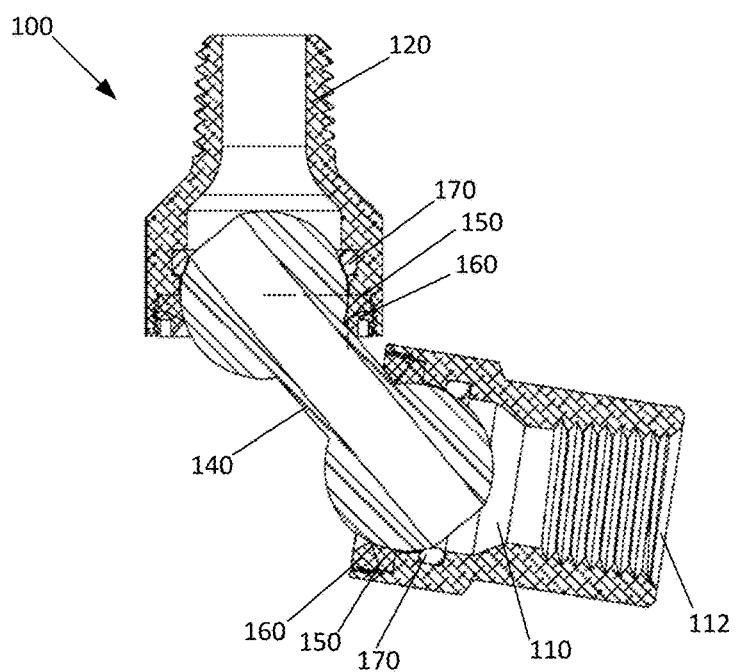
FIG. 34 is a cross-sectional view of the orbital coupling arrangement shown in FIG. 33.
Figure 35:
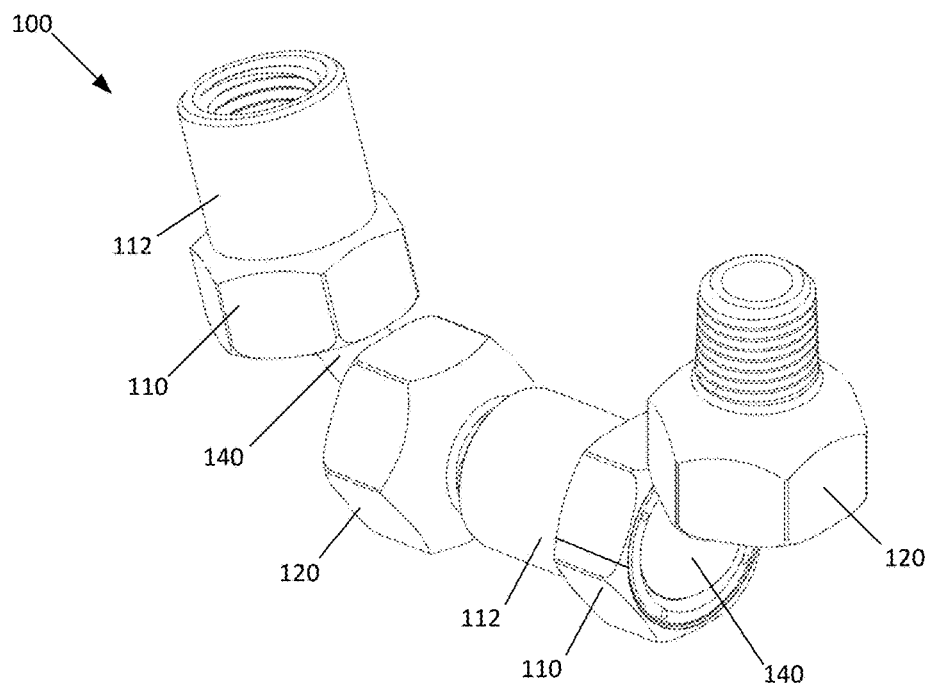
FIG. 35 is a perspective view of two of the orbital coupling arrangements shown in FIG. 33 that are coupled to each other.
Figure 36:
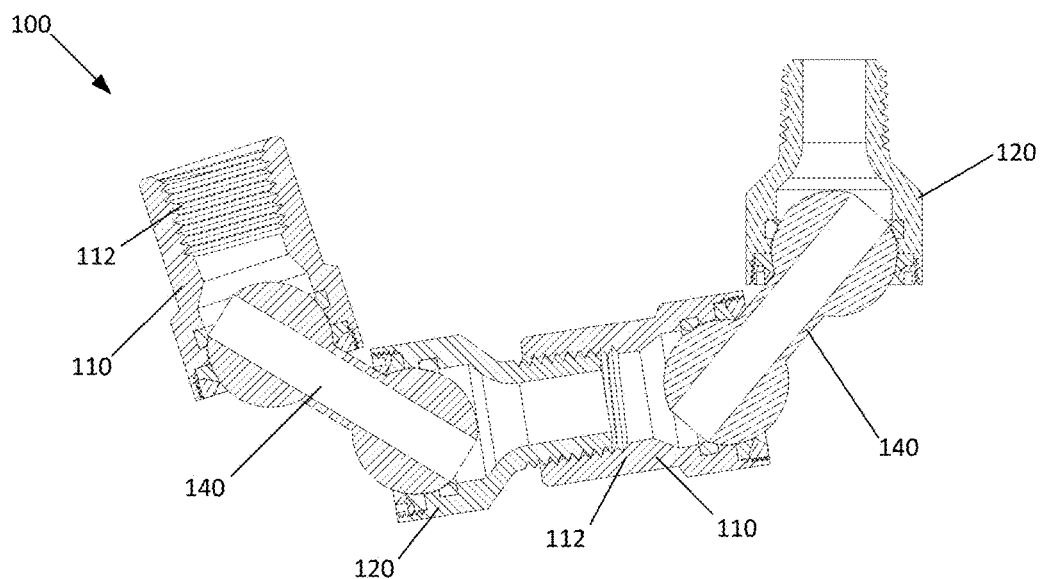
FIG. 36 is a cross-sectional view of the coupled orbital coupling arrangements shown in FIG. 35.
Figure 37:
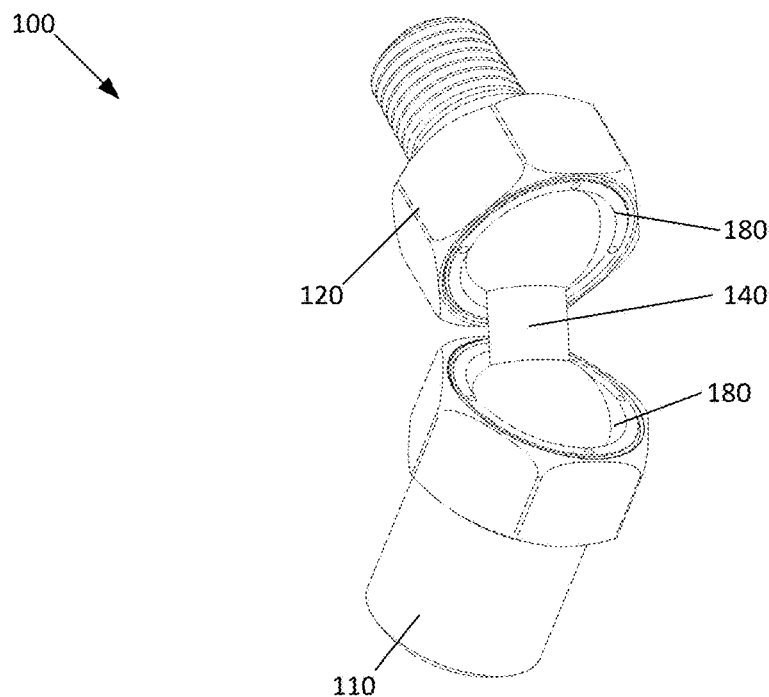
FIG. 37 is a perspective view of a fifth example of an orbital coupling arrangement usable in a compressed air system of the type shown in FIG. 1.
Figure 38:
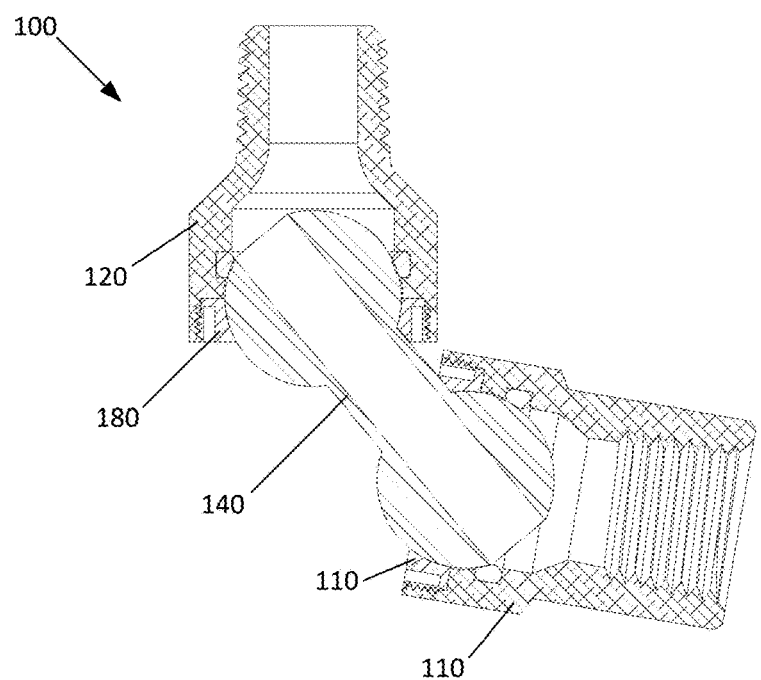
FIG. 38 is a cross-sectional view of the orbital coupling arrangement shown in FIG. 37.
Figure 39:
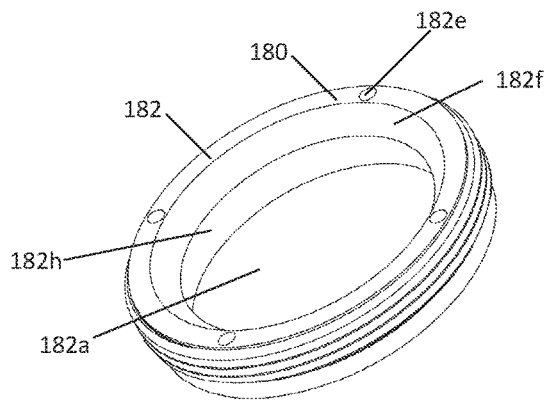
FIG. 39 is a perspective view of a retaining member or ring usable with the first and second coupling members shown in FIG. 37.
Figure 40:
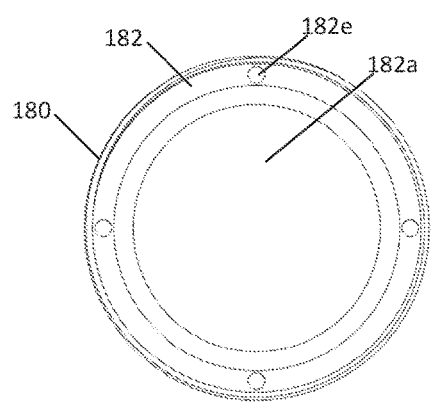
FIG. 40 is a top view of the retaining member or ring shown in FIG. 39.
Figure 41:
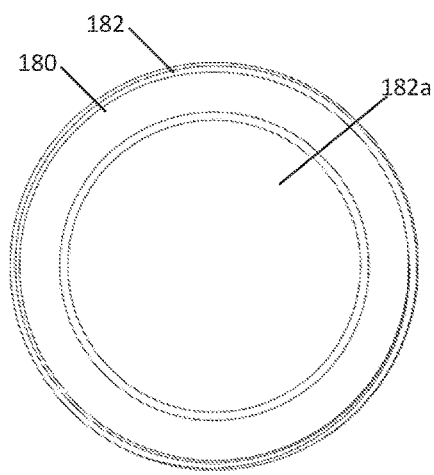
FIG. 41 is a bottom view of the retaining member or ring shown in FIG. 39.
Figure 42:
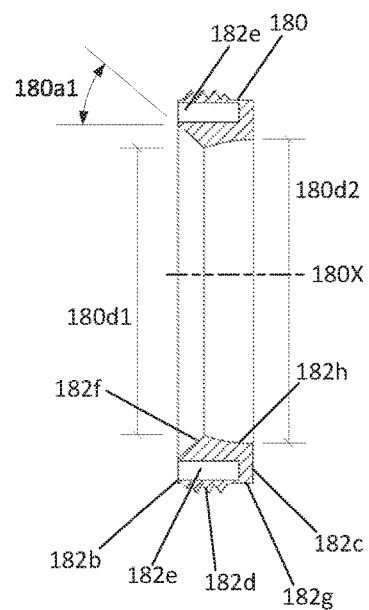
FIG. 42 is a cross-sectional view of the retaining member or ring shown in FIG. 39.

Proximate the first end 110a, the main body 112 defines a connection arrangement 112b. In the example shown, the connection arrangement 112b is a female threaded arrangement with NPT-type threads for connection with corresponding male threads of the connector 14. The connection arrangement 112b can be any type of arrangement to suit any particular application, such as male threads, a quick connect plug, unions, gender changers, or a female quick coupler. For example, the orbital coupling arrangement 100 shown in FIGS. 31 and 32 has a first connector part 110 with a connection arrangement 112b configured as a male quick connect plug. FIGS. 33 and 34 show another example of an orbital coupling arrangement 100 in which the first connector part 110 has a connection arrangement 112b configured as a hose barb. FIGS. 35 and 36 show yet another example of an orbital coupling arrangement 100 in which the first connector part 110 has a connection arrangement 112b configured with female threads, such as NPT-type threads. In the example shown, the female threads are complementarily shaped to the male threads on the connector part 120 which allows for multiple coupling arrangements 100 to be coupled together in chain-like fashion in order to achieve greater total orbital angles. Such an arrangement is shown at FIGS. 35 to 36.

Proximate the second end 110b, the main body 112 further defines a second connection arrangement 112c. As shown, the connection arrangement 112c is shown as a female threaded arrangement. Adjacent the connection arrangement 112c, a bore 112d is provided. In one aspect, the bore 112d is defined by a sidewall 112e and a shoulder 112f. The bore 112d is for receiving the load ring or member 150 while the connection arrangement 112c is for receiving and retaining the lock ring or member 160. When the lock ring or member 160 is screwed onto the main body 112, the lock ring or member 160 is supported by the shoulder 112f of the bore 112d such that the shoulder 112f accepts the load exerted by the lock ring or member 160 onto the lock ring or member 160 rather than the orbital member 140. Adjacent he bore 112d is a transition bore 112g that extends to a seal groove 112h. The seal groove 112h is for accepting the seal ring or member 170 such that the seal member 170 can form a seal with the orbital member 140. A transition bore 112i is shown extending between the seal groove 112h and the connection arrangement 112b. The main body 112 is also provided with a hex surface 112j such that a wrench can be utilized to fix the main body 112 as the lock ring or member 160 is threaded and tightened onto the connection arrangement (i.e. threads) 112c.

Figure 11:
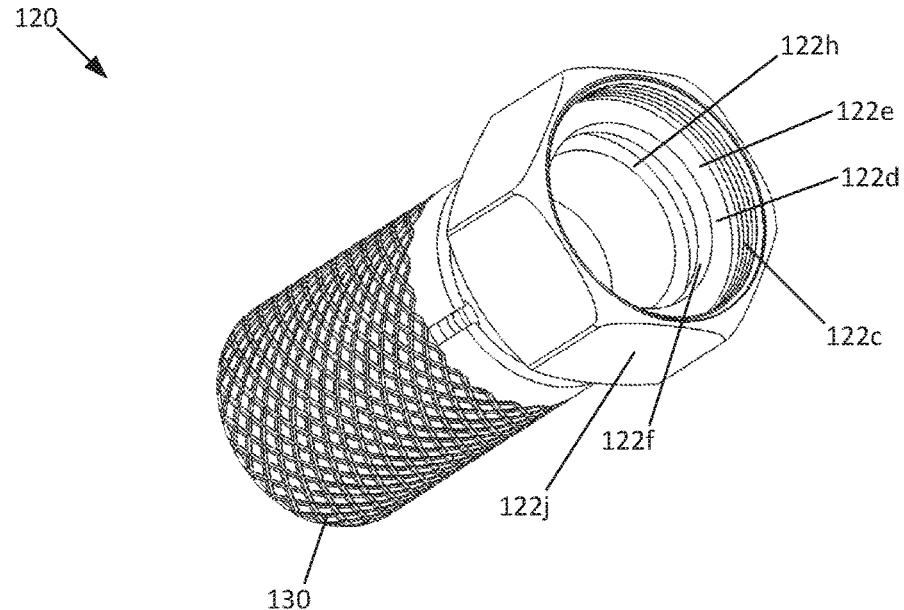
FIG. 11 is a perspective view of a portion of the second coupling member of the orbital arrangement shown in FIG. 3.
Figure 12:
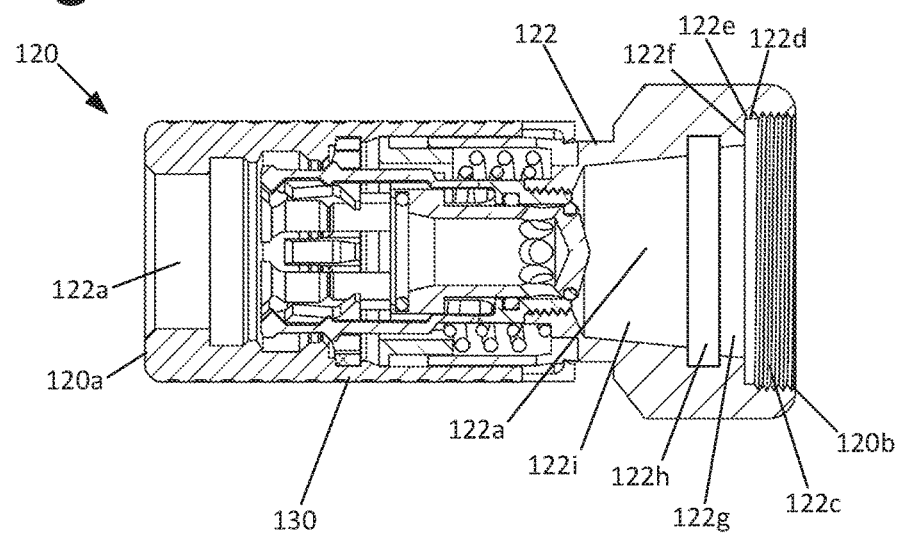
FIG. 12 is a cross-sectional view of the second coupling member portion shown in FIG. 11.
Figure 13:
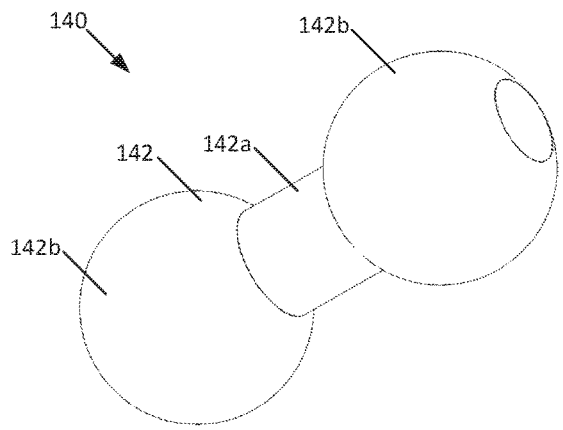
FIG. 13 is a perspective view of an orbital member usable with the first and second coupling members shown in FIG. 3.
Figure 14:
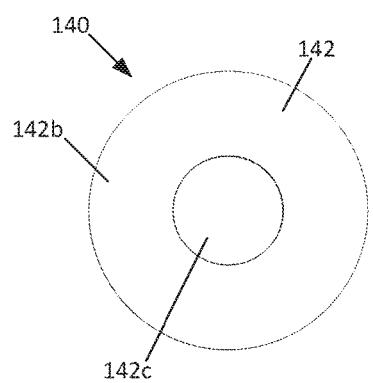
FIG. 14 is an end view of the orbital member shown in FIG. 13.
Figure 15:
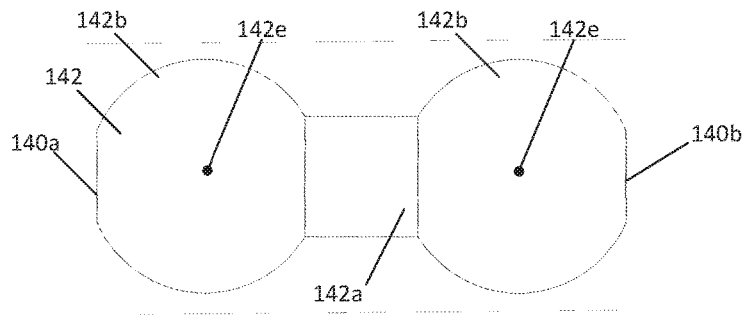
FIG. 15 is a side view of the orbital member shown in FIG. 13.
Figure 16:
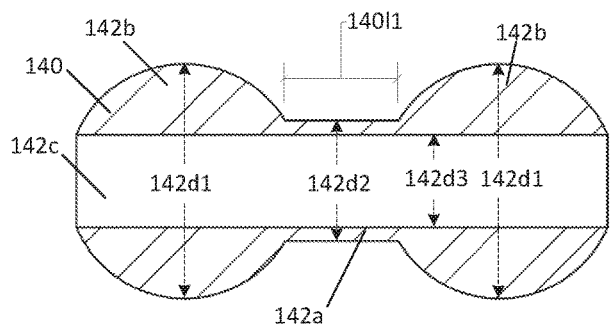
FIG. 16 is a cross-sectional view of the orbital member shown in FIG. 13.
Figure 17:
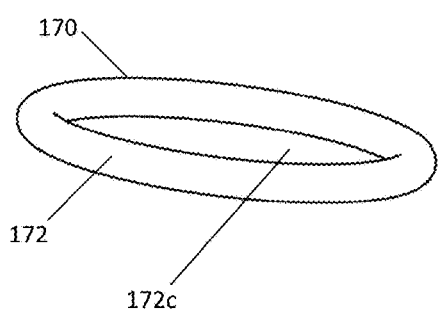
FIG. 17 is a perspective view of a seal ring or member usable with the first and second coupling members shown in FIG. 3.
Figure 18:
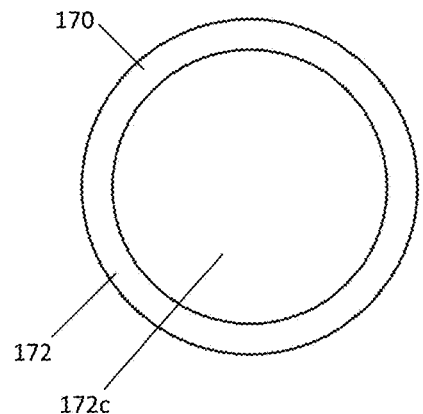
FIG. 18 is a top view of the seal ring or member shown in FIG. 17.
Figure 19:
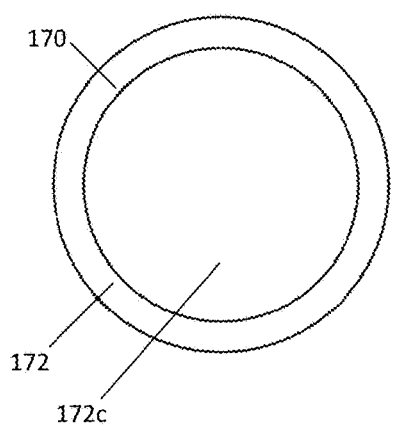
FIG. 19 is a bottom view of the seal ring or member shown in FIG. 17.
Figure 20:
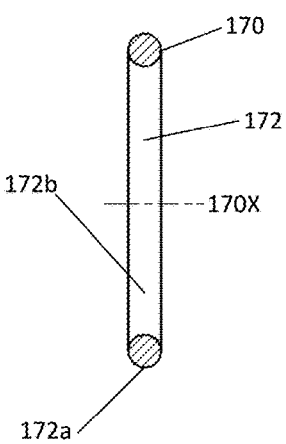
FIG. 20 is a cross-sectional view of the seal ring or member shown in FIG. 17.
Figure 21:
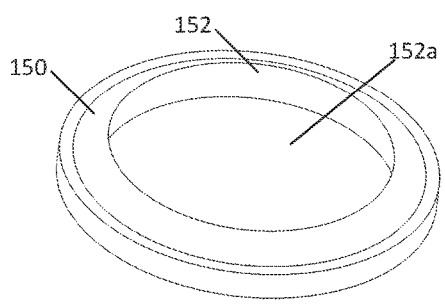
FIG. 21 is a perspective view of a load ring or member usable with the first and second coupling members shown in FIG. 3.
Figure 22:
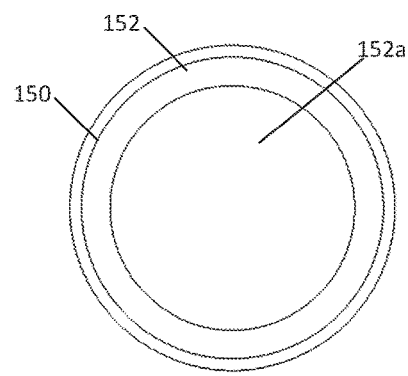
FIG. 22 is a top view of the load ring or member shown in FIG. 21.
Figure 23:
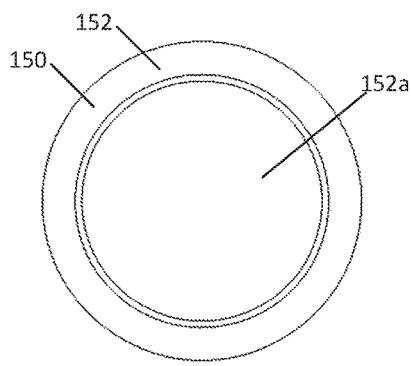
FIG. 23 is a bottom view of the load ring or member shown in FIG. 21.
Figure 24:
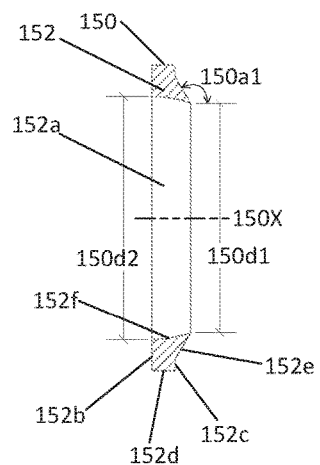
FIG. 24 is a cross-sectional view of the load ring or member shown in FIG. 21.
Figure 25:
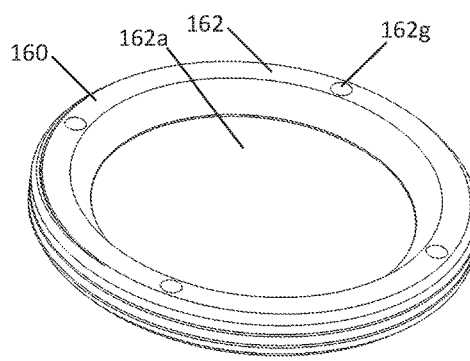
FIG. 25 is a perspective view of a lock ring or member usable with the first and second coupling members shown in FIG. 3.
Figure 26:
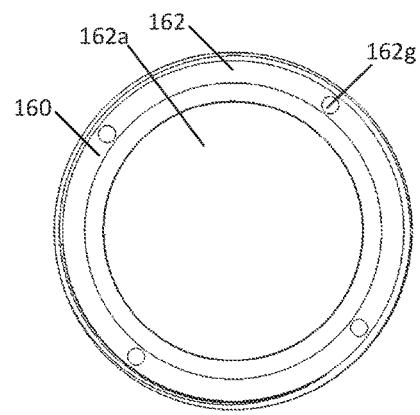
FIG. 26 is a top view of the lock ring or member shown in FIG. 25
Figure 27:
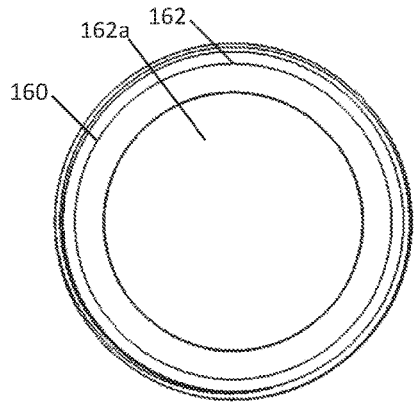
FIG. 27 is a bottom view of the lock ring or member shown in FIG. 25.
Figure 28:
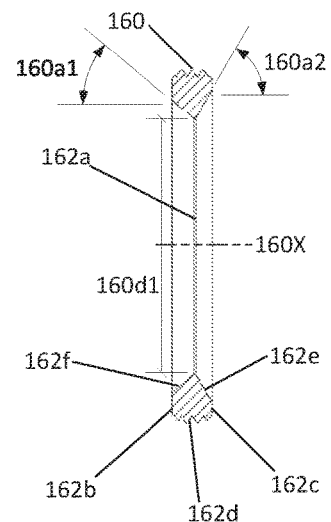
FIG. 28 is a cross-sectional view of the lock ring or member shown in FIG. 25.
Figure 29:
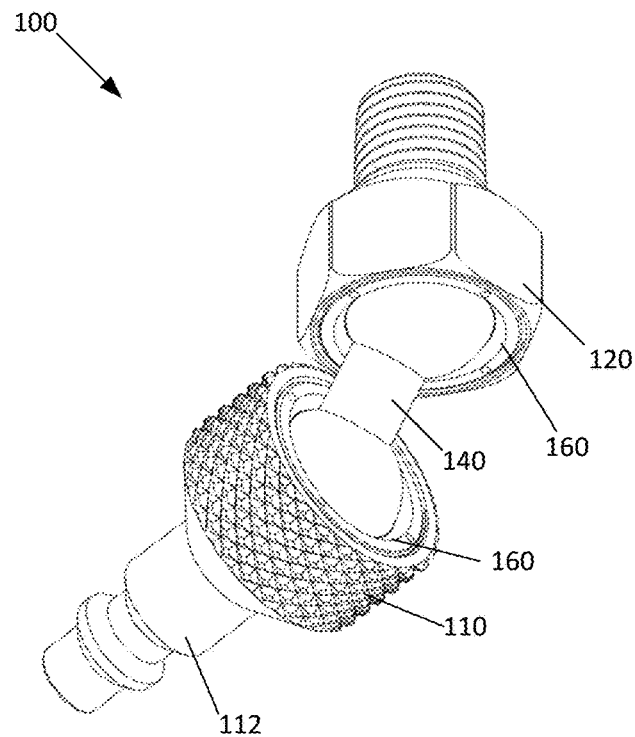
FIG. 29 is a perspective view of a second example of an orbital coupling arrangement usable in a compressed air system of the type shown in FIG. 1.
Figure 30:
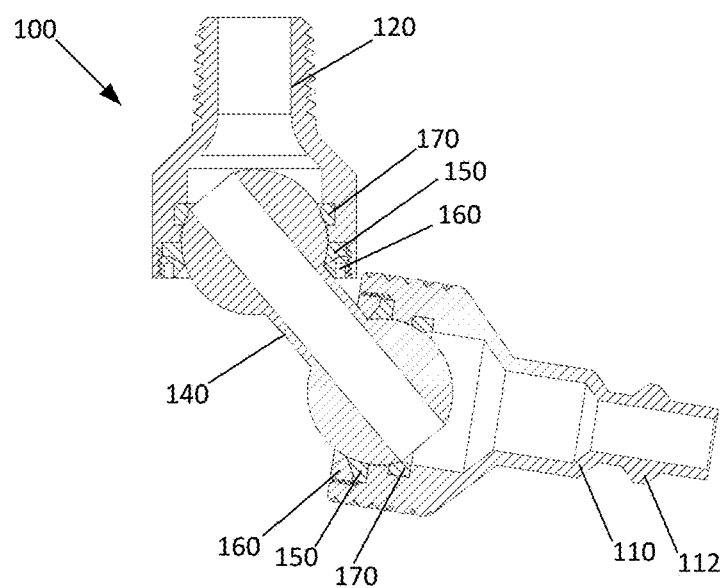
FIG. 30 is a cross-sectional view of the orbital coupling arrangement shown in FIG. 29.

The second connector part 120 is shown in isolation at FIGS. 11-12. As mentioned previously, the first connector part 110 can be completely identical to the second connector part 120, if desired for a particular application. In the example shown, the second connector part 120 differs from the first connector part 110 in that the second connector part 120 is provided with a connection arrangement 130 configured as a female quick-connect coupler instead as a threaded arrangement. However, the features of the second connector part 120 relating to the securement and retention of the load ring or member 150, lock ring or member 160, and seal member 170 are the same as those already described for the first connector part 110. Accordingly, the second connector part 120 is provided with a main body 122 defining a connection arrangement 122c, bore 122d, sidewall 122e, shoulder 122f, transition bore 122g, seal groove 122h, and a hex surface 112j. The second connector part main body 122 can be a machined or molded, plastic or metal component.

As with the first connector part 110, the second connector part connection arrangement 130 could be alternatively provided with any type of arrangement to suit a particular application, such as female threads, male threads, a male quick connect plug, etc. For example, the orbital coupling arrangements 100 shown in FIGS. 31 to 34 have a second connector part 120 with a connection arrangement 130 configured with male NPT threads.

The disclosed connection arrangement 130 can be any type of connection arrangement, for example a standard quick connect coupler configured to receive a male quick connect plug 16 of the type shown at FIG. 1.

Referring to FIGS. 13 to 16, the orbital member 140 is shown in isolation. As presented, the orbital member 140 extends between a first end 140a and a second end 140b. In one aspect, the orbital member 140 has a main body 142 in the general shape of a bar-bell with a cylindrical or tubular portion 142a extending between oppositely disposed generally spherical segments 142b. In the example shown, the spherical segments 142b are identical with an outer diameter 142d1. However, the spherical segments 142b could be differently sized. The tubular portion 142a is shown as having a length 14011 and a diameter 142d2. In one aspect, the length 14011 is sufficient such that the first and second connector parts 110, 120 do not contact each other when they are moved to the maximum angle a1. Rather, the length 14011 ensures that the maximum angle a1 (discussed later) is defined by contact between the orbital member tubular portion 142a and the lock ring or member 160 of each connector part 110, 120. An internal passageway 142c extends through the tubular portion 142a and the spherical segments 142b, and is shown as having an internal diameter 142d3. In one example, length 14011 is 0.30 inch, diameter 142d1 is 0.625 inch, diameter 142d2 is 0.32 inch, and diameter 142d3 is 0.236 inch.

Figure 2A:
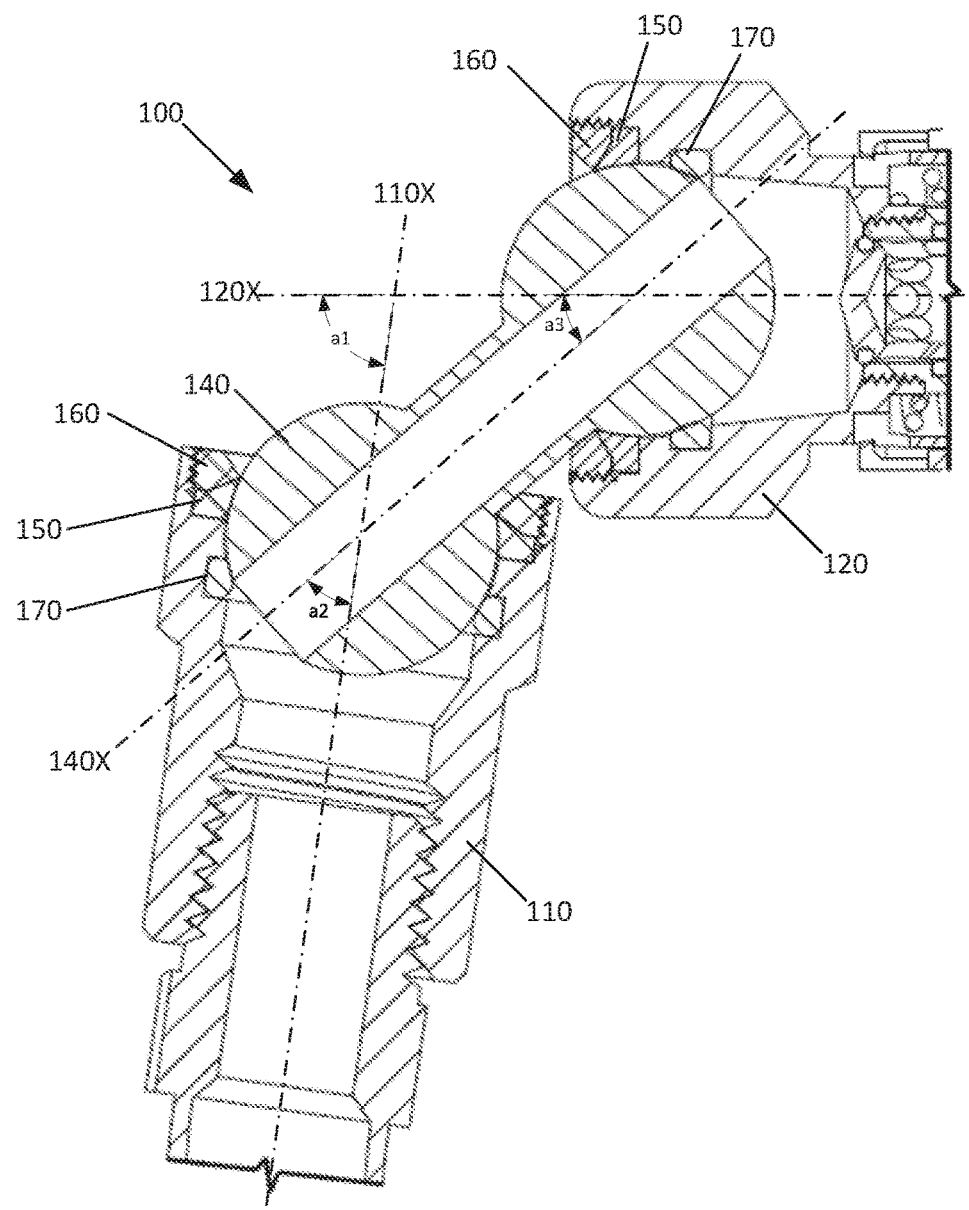
FIG. 2A is an enlarged portion of the view shown in FIG. 2.
Figure 3:
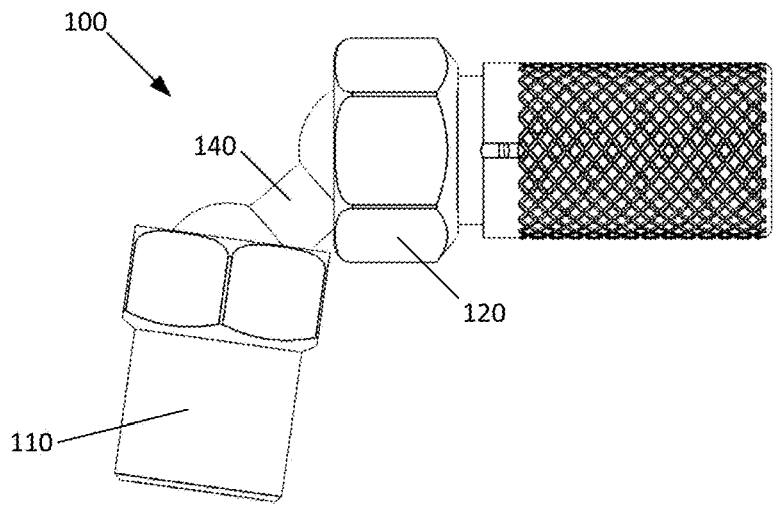
FIG. 3 is a side view of an orbital coupling arrangement of the compressed air piping system shown in FIG. 1.
Figure 4:
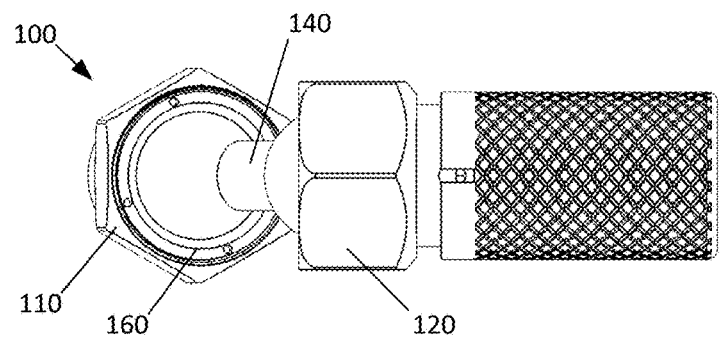
FIG. 4 is a first end view of the orbital coupling arrangement shown in FIG. 3.
Figure 5:
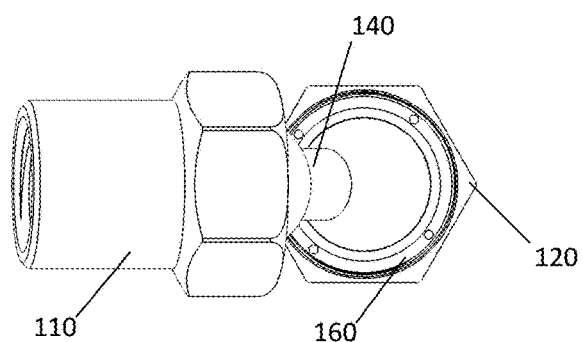
FIG. 5 is a second end view of the orbital coupling arrangement shown in FIG. 3.
Figure 6:
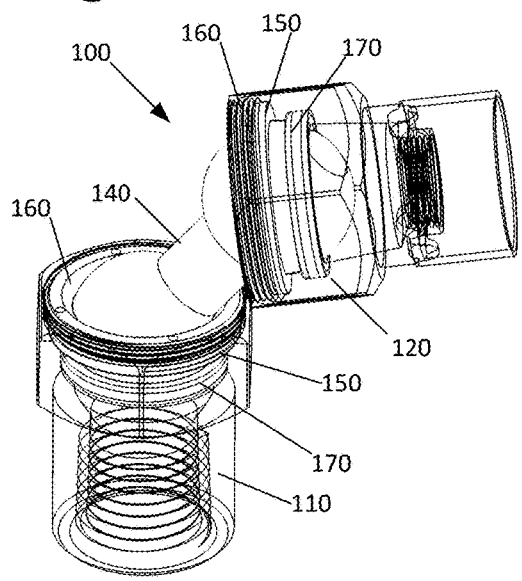
FIG. 6 is a perspective view of the orbital coupling arrangement shown in FIG. 3 with a first coupling member and a second coupling member shown as being transparent.
Figure 7:
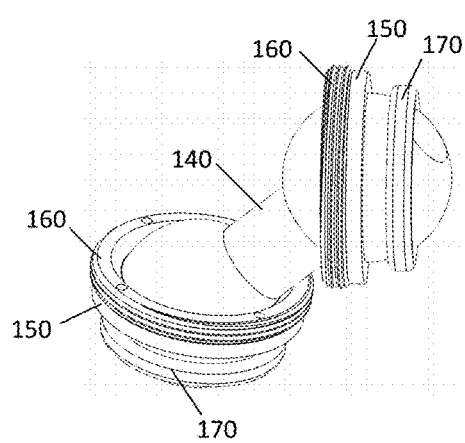
FIG. 7 is a perspective view of the orbital coupling arrangement shown in FIG. 3 with the first and second coupling members removed.
Figure 8:
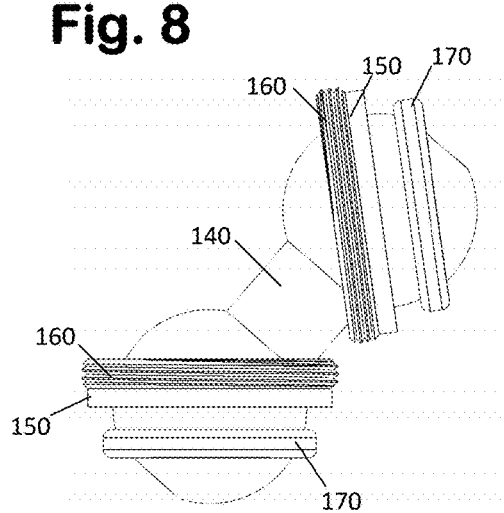
FIG. 8 is a side view of the orbital coupling arrangement shown in FIG. 3 with the first and second coupling members removed.

Referring to FIGS. 17-20, the seal member 170 is shown in isolation. In the example shown, the seal member 170 is formed as an O-ring from a polymeric material, such as a rubber material. In one example, the seal member 170 is formed from a 70 duromoter buna nitrile rubber or silicone material. As presented, the seal member 170 is defined by a main body 172 having a generally rounded or circular cross-sectional shape defining an annulus with a central opening 172c. In one aspect, the main body 172 has a central axis 170X, an outer perimeter surface 172a, and an inner surface 172b. When the seal member 170 is inserted into the seal groove 112h, 122h of the first or second connector part 110, 120, the outer perimeter surface 172a abuts the inner surfaces of the seal groove 112h, 122h while the seal member portion 172c faces general towards the second end 110b, 120b. As can be most easily seen at FIG. 2A, the inner perimeter surface 172b deforms to conform to the spherical segments 142b at the location of contact between the seal surface 172b and the spherical segments 142b.

Referring to FIGS. 21-24, the load ring or member 150 is shown in isolation. In one aspect, the example shown, the load ring or member 150 is formed from a low friction polymeric material, such as a polytetrafluoroethylene (PTFE). Other materials can also be used, such as PerFluoroAlkoxy (PFA), fluorinated ethylene propylene (FEP), and possibly ultra-high-molecular-weight polyethylene (HM-WPE, UHMWPE) for low temp applications. As presented, the load ring or member 150 is defined by a main body 152 having an asymmetrical cross-sectional shape. In one aspect, the main body 152 is formed as an annulus defining a central opening 152a. The main body 152 is defined by a first end surface 152b, a second end surface 152c, an outer perimeter surface 152d extending between the first and second end surfaces 152b, 152c, a third end surface 152e extending from the second end surface 150c to the central opening 152a, and an interior surface 152f extending between the third end surface 152d and the first end surface 152b. In one aspect, the third end surface 152e is disposed at an angle 150a1 with respect to the longitudinal axis 150X of the load ring or member 150.

The interior surface 152f is defined as a spherical segment and has a curvature that matches the curvature of the spherical segments 142b. Accordingly, when the load ring or member 150 is installed onto the orbital member 140, all portions of the interior surface 152f are in contact with some portion of the spherical segment 142 to which the load ring or member 150 is mounted. Due to the spherical segment shape of the interior surface 152f, the interior surface has a first diameter 150d1 proximate the third end wall 152f and a second diameter 150d2 proximate the first end wall 152b, wherein the second diameter 150d2 is larger than the first diameter 150d1. As the load ring or member 150 is formed from a low friction material, frictional forces between the load ring or member 150 and the spherical segment 142b are minimized. In one example, diameter 150d1 is 0.592 inch, the diameter 150d2 is 0.625 inch, and the angle 150a1 is 120 degrees.

In one aspect, the both the first and second diameters 150d1, 150d2 are less than the diameter 142d1 of the spherical segments 142b of the orbital member 140. Accordingly, the spherical segment 142b cannot pass through the central opening 152a without deflection or deformation of the load ring or member 150. As the load ring or member 150 is formed from a polymeric material with a particular geometry, sufficient elasticity exists to allow the load ring or member 150 to be expanded over the spherical segment 142b such that at least a portion of the load ring or member can be positioned between the orbital member tubular portion 142a and the geometric center 142e of the spherical segment 142b.

When the load ring or member 150 is installed into the first or second connector part 110, 120, the first end surface 150b abuts and is supported by the shoulder 112f, 122f while the outer perimeter surface 152d rests adjacent the sidewall 112e, 122e of the connector part main body 112, 122.

Referring to FIGS. 25-28, the lock ring or member 160 is shown in isolation. In one aspect, the example shown, the lock ring or member is formed from a polymeric material, such as Delrin (Dupont of Wilmington, Del.) or some other acetal resin. In one aspect, the lock ring or member 160 is formed from a material that is harder than the material from which the load ring or member 150 is formed. As presented, the lock ring or member 160 is defined by a main body 162 having an asymmetrical cross-sectional shape. In one aspect, the main body 162 is formed as an annulus defining a central opening 162a. The main body 162 is defined by a first end surface 162b, a second end surface 162c, and an outer threaded portion 162d extending between the first and second end surfaces 162b, 162c. The outer threaded portion 162d is configured to engage with the threads 112c, 122c of the first and second connector parts 110, 120. The lock ring or member 160 can be provided with a tool engagement arrangement 162g for enabling an assembler to use a tool to tighten the lock ring or member 160 onto the first and second connector parts 110, 120. In the example shown, the tool engagement arrangement 162g is a plurality (e.g. two, four, six, eight, etc.) of partial-depth bores 162g radially spaced about the first end surface 162b. Protrusions could also be used instead of bores, although reduced clearances between the connector parts 110, 120 and the orbital member 140 may result.

The lock ring or member main body 162 is also defined by a first interior surface 162e and a second interior surface 162f that meet to define a diameter 160d1 of the central opening 162a. In one aspect, the first interior surface 162e extends at an angle 160a2 with respect to the longitudinal axis 160X of the lock ring or member 160. In one aspect, the second interior surface 162f extends at an angle 160a1 with respect to the longitudinal axis 160X of the lock ring or member 160. As configured, the angle 160a2 equals the angle 150a1 such that the first interior surface 162e of the lock ring or member 160 can contact the third end surface 152e of the load ring or member 150 in a flush manner. In this position, the second end surface 152c of the load ring or member 150 is also in flush contact with the second end surface 162c of the lock ring or member 160. In one example, diameter 160d1 is 0.60 inch, the angle 160a1 is 40 degrees, and the angle 160a2 is 60 degrees.

In one aspect, the diameter 160d1 is less than the diameter 142d1 of the spherical segments 142b of the orbital member 140. Accordingly, the spherical segment 142b cannot pass through the central opening 162a without deflection or deformation of the lock ring or member 160. As the lock ring or member 160 is formed from a polymeric material with a particular geometry, sufficient elasticity exists to allow the lock ring or member 160 to be expanded over the spherical segment 142b. As both the lock ring or member 160 and the load ring or member 150 are elastically deformable, the orbital member 140 can be manufactured as a single part with two spherical segments 142b. Where the load and/or lock ring or members 150, 160 are formed from a non-elastic material, such as a metal material, the orbital member 140 can be formed as a multiple part assembly (e.g. tube section is configured as two threaded parts) such that the load and lock ring or members 150, 160 can be slid over the tubular section 142a and brought into contact spherical segment 142b.

In one example, the load ring or member 150 and the lock ring or member 160 can be combined into a single retaining ring or member. Such a configuration is shown at FIGS. 37 to 42, wherein a unitarily formed retaining ring or member 180 is provided in the first and second connector parts 110, 120 of the coupling arrangement shown in FIGS. 33 and 34, in lieu of separate load and lock ring or members 150, 160. The retaining ring or member 180 can formed from a low friction polymeric material with sufficient strength to retain the orbital member 180 within the connector part 110, 120, such as a polytetrafluoroethylene (PTFE). Other materials can also be used, such as PerFluoroAlkoxy (PFA), fluorinated ethylene propylene (FEP), and possibly ultra-high-molecular-weight polyethylene (HMWPE, UHMWPE) for low temp applications.

The retaining ring or member 180 is shown in isolation at FIGS. 39 to 42, where it can be seen that the retaining ring or member 180 has the combined features of the load and lock ring or members 150, 160. For example, the retaining ring or member 180 can be defined by a main body 182 having an asymmetrical cross-sectional shape. In one aspect, the main body 182 is formed as an annulus defining a central opening 182a. The main body 182 is defined by a first end surface 182b, a second end surface 182c, and an outer threaded portion 182d extending partially or wholly between the first and second end surfaces 182b, 182c. The outer threaded portion 182d is configured to engage with the threads 112c, 122c of the first and second connector parts 110, 120. The retaining ring or member 180 can be provided with a tool engagement arrangement 182e for enabling an assembler to use a tool to tighten the lock ring or member 160 onto the first and second connector parts 110, 120. In the example shown, the tool engagement arrangement 182e is a plurality (e.g. two, four, six, eight, etc.) of partial-depth bores 182e radially spaced about the first end surface 182b. Protrusions could also be used instead of bores, although reduced clearances between the connector parts 110, 120 and the orbital member 140 may result.

The retaining ring or member main body 182 is also defined by a first interior surface 182f defining a diameter 180d1 of the central opening 182a. In one aspect, the second interior surface 182f extends at an angle 180a1 with respect to the longitudinal axis 180X of the retaining ring or member 180. In one example, diameter 180d1 is 0.60 inch and the angle 180a1 is 60 degrees. In one aspect, the diameter 180d1 is less than the diameter 142d1 of the spherical segments 142b of the orbital member 140. Accordingly, the spherical segment 142b cannot pass through the central opening 162a without deflection or deformation of the retaining ring or member 180.

In one aspect, the retaining ring or member 180 further defines an outer perimeter surface 182g extending between the second end surface 182c and the threaded portion 182d, and an interior surface 182h extending between second end surface 182c and the interior surface 182f. The interior surface 182h is defined as a spherical segment and has a curvature that matches the curvature of the spherical segments 142b. Accordingly, when the retaining ring or member 180 is installed onto the orbital member 140, all portions of the interior surface 182h are in contact with some portion of the spherical segment 142 to which the retaining ring or member 180 is mounted. Due to the spherical segment shape of the interior surface 182h, the interior surface has the diameter 180d1 proximate the interior surface 182f and a second diameter 180d2 proximate the second end wall 182c, wherein the second diameter 180d2 is larger than the first diameter 180d1. As the retaining ring or member 180 is formed from a low friction material, frictional forces between the retaining ring or member 180 and the spherical segment 142b are minimized. In one example, diameter 180d1 is 0.592 inch and the diameter 180d2 is 0.625 inch.

In one aspect, the both the first and second diameters 180d1, 180d2 are less than the diameter 142d1 of the spherical segments 142b of the orbital member 140. Accordingly, the spherical segment 142b cannot pass through the central opening 182a without deflection or deformation of the retaining member or ring 180. As the retaining ring or member 180 is formed from a polymeric material with a particular geometry, sufficient elasticity exists to allow the retaining ring or member 180 to be expanded over the spherical segment 142b such that at least a portion of the load ring or member can be positioned between the orbital member tubular portion 142a and the geometric center 142e of the spherical segment 142b. Such a configuration enables the orbital member 140 to be manufactured as a single part with two spherical segments 142b. Where the retaining ring or member 180 is formed from a non-elastic material, such as a metal material, the orbital member 140 can be formed as a multiple part assembly (e.g. tube section is configured as two threaded parts) such that the retaining ring or member 180 can be slid over the tubular section 142a and brought into contact spherical segment 142b.

When the retaining ring or member 180 is installed into the first or second connector part 110, 120, the end surface 182c abuts and is supported by the shoulder 112f, 122f while the outer perimeter surface 182g rests adjacent the sidewall 112e, 122e of the connector part main body 112, 122.

To assembly either end of the orbital coupling arrangement 100, the lock ring or member 160 is first mounted onto the orbital member 140 such that at least a portion of the lock ring or member 160 is located between the orbital member tubular portion 142a and the geometric center 142e of the spherical segment 142b, and such that the first interior surface 162e of the lock ring or member 160 is generally facing towards the spherical segment 142b over which the lock ring or member 160 is mounted.

After the lock ring or member 160 is mounted onto the orbital member 140, the load ring or member 150 can be mounted to the orbital member 140 in the manner already described above such that at least a portion of the load ring or member 150 is located between the lock ring or member 160 and the geometric center 142e of the spherical segment 142b. The load ring or member 150 is oriented on the orbital member 140 such that the first end surface 152b of the load ring or member is generally facing towards the spherical segment 142b and such that the interior surface 152f is in contact with the outer surface of the spherical segment 142b.

Where the retaining member or ring 180 is used in lieu of the load and lock ring or members, 150, 160, the above two steps are completed as a single step in which the retaining member or ring 180 is mounted onto the orbital member 140.

Once the lock ring or member 160 and load ring or member 150 (or retaining member or ring 180) have been mounted onto the orbital member 140, the spherical segment 142b can be inserted into the first or second connector part second end 110b, 120b. However, prior to this step, the seal member 170 is placed within the connector part seal groove 112h, 122h. After the seal member 170 is installed, the orbital member 140 can be inserted into the connector part end 110b, 120b until the spherical segment 142b seats onto the seal member 170. Once such contact is made, the load ring or member 150 (or retaining member or ring 180) can be seated into the connector part 110, 120 such that the first end surface 152b seats onto the shoulder 122f, as previously stated. Once the load ring or member 150 is seated, the lock ring or member 160 can then be threaded onto the connector part threads 112c, 122c. Where the retaining ring or member 180 is provided, seating occurs as the retaining member or ring 180 is threaded onto the connector part 110, 120. Since the diameter 150d1 of the load ring or member 150 and the diameter 160d1 of the lock ring or member 160 are less than the diameter 142d1 of the spherical segment 142b, the orbital member 140 is retained to the connector part 110, 120 once the lock ring or member 160 is fully threaded onto the connector part 110, 120. Although the lock ring or member 160 and load ring or member 150 are elastically deflectable, the connection arrangement or threads 112c, 122c and the sidewall 112e, 122e prevent such deflection from occurring once the lock ring or member 160 is threaded onto the connector part 110, 120. Thus, the spherical segment 142b is securely retained by the load ring or member 150 and lock ring or member 160 once the lock ring or member 160 is threaded onto the connector part 110, 120.

As the lock ring or member 160 (or retaining member or ring 180) is tightened onto the connection arrangement or threads 112c, 122c, the load ring or member 150 is compressed between the lock ring or member 160 and the shoulder 122f, with the load ring or member 150 (or retaining member or ring 180) deforming to some extent onto the spherical segment 142b to aid in preventing external contamination. In one aspect, the shoulder 122f prevents the load ring or member 150, and in turn the spherical segment 142b, from being drawn towards the seal member 170 as the lock ring or member 160 is being tightened. Notably, this interaction does not continually force the spherical segment 142b into further and further engagement with the seal member 170 as the lock ring or member 160 is being tightened as a positive stop is provided by the shoulder 122f. This interaction also applies where the retaining member or ring 180 is used. Because of this configuration, excessive frictional forces between the seal member 170 and orbital member 140 are avoided that could inhibit or altogether prevent rotational movement between the connector part 110, 120 and the orbital member 140. Additionally, the seal member 170 is advantageously located between the end 140a, 140b of the orbital member 140 and the geometric center 142e of the spherical segment 140b which can further reduce frictional forces.

Once both connector parts 110, 120 are assembled onto the orbital member 140, as described above, the fluid passageway 112a of the first connector part 110 is placed in fluid communication with the fluid passageway 122a of the second connector part 120 via the internal passageway 142c of the orbital member 140. Thus compressed air or another fluid (liquid or gas) can flow from the first connector part 110 to the second connector part 120, or vice-versa.

In one aspect, the orbital coupling arrangement 100 is configured such that, the first connector part 110 can be rotated relative to the second connector part 120 such that the first and connector parts 110, 120 form an angle a1 with respect to each other. The angle a1 is the angle from the longitudinal axis 110X of the first connector part 110 to the longitudinal axis 120X of the second connector part 120. When the first and second connector parts 110, 120 are coaxially aligned, the angle a1 is zero. In the example shown, the first and second connector parts 110, 120 are configured such that a maximum angle a1 of about 82 degrees can be achieved. At this maximum angle, and all angles between zero and this angle, the first connector part 110 can be rotated a full 360 degrees about the second connector part 120, and vice versa. In one aspect, the maximum angle a1 is achieved by the sum of the maximum angle a2 that can be achieved between the orbital member 140 and the first connector part 110 and the maximum angle a3 that can be achieved between the orbital member 140 and the second connector part 120. In the example shown, the angles a2 and a3 are equal at about 41 degrees since the geometries of the orbital member 140, load ring or member 150, and lock ring or member 160 (or retaining member or ring 180) are the same at each end of the orbital member 140. In one example, the angles a1, a2 are at least 20 degrees for a resulting angle a1 of at least 40 degrees, and are more preferably at least 30 degrees for a resulting angel a1 of at least 60 degrees, and even more preferably at least 40 degrees for a resulting angle a1 of at least 80 degrees. However, it is entirely possible to provide the orbital member 140, load ring or member 150, and lock ring or member 160 (or retaining member or ring 180) with different geometries at each end of the orbital member 140 such that the angles a2 and a3 are not equal. In either case, the angle a1 will remain the sum of the angles a2 and a3. It is also possible to achieve even greater total angles than angle a1 by coupling multiple connector parts 110 and/or 120 together. For example, an intermediate first connector part 110 could be configured to retain a first orbital member 140 at one end (as shown) and a second orbital member 140 at the other end (i.e. instead of male connector 14). The other end of the second orbital member 140 could then be connected to the first connector part 110 of the type shown in the drawings. With such a configuration, the rotational angle between the first and second connector parts 110, 120 can be effectively doubled.

In one aspect, the advantageous designs disclosed herein allow for an orbital coupling arrangement 100 to be constructed that can rotate or swivel freely up to 150 psi of pressure within the coupling arrangement 100. Many prior art designs become very difficult to move at such pressures.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

The invention claimed is:

1. An orbital coupling arrangement comprising:
    a. a first connector part defining a central passageway and including a first connection arrangement at a first end and a second connection arrangement at a second end;
    b. an orbital member defining a spherical segment and an adjacent tubular segment that together define a central passageway extending between a first end proximate the spherical segment and a second end proximate the tubular segment;
    c. a seal member defining a longitudinal axis and forming a seal between the orbital member spherical segment and the first connector part; and
    d. a retaining member rotatably securing the orbital member to the first connector part, the retaining member being separable from the first connector part, the retaining member including:
        i. an annular load ring defining a first interior curved surface in contact with and complementary to a curvature of the spherical segment, the annular load ring defining an outer end surface extending at an oblique angle to a longitudinal axis of the annular load ring; and
        ii. an annular lock ring securing the load ring to the first connector part, the annular lock ring having a second interior surface in flush surface contact with the annular load ring end surface;
    e. wherein the annular load ring and the annular lock ring contact the orbital member on a first side of a first plane and the seal member contacts the orbital member on a second side of the first plane, wherein the first plane extends both orthogonally to the seal member longitudinal axis and through a geometric center of the orbital member spherical segment.

2. The orbital coupling arrangement of claim 1, wherein one or both of the annular load ring and annular lock ring of the retaining member is a polymeric material.

3. The orbital coupling arrangement of claim 1, wherein the annular lock ring is threaded onto the first connector part.

4. The orbital coupling arrangement of claim 1, wherein the first connector part includes a recess with a shoulder portion against which a face of the retaining member annular load ring abuts.

5. The orbital coupling arrangement of claim 1, wherein the first connector part defines a circumferential groove within which the seal member is partially disposed.

6. The orbital coupling arrangement of claim 5, wherein the retaining member includes a tool engagement arrangement for receiving a tool configured to rotate and tighten the annular lock ring with respect to the first coupling part.

7. An orbital coupling arrangement comprising:
    a. a first connector part defining a first central passageway;
    b. a second connector part defining a second central passageway;
    c. an orbital member defining a tubular portion extending between a first spherical segment and a second spherical segment, the orbital member defining a third central passageway;
    d. a first seal member defining a first longitudinal axis and forming a seal between the orbital member first spherical segment and the first connector part;
    e. a second seal member defining a second longitudinal axis and forming a seal between the orbital member second spherical segment and the second connector part;
    f. a first retaining member rotatably securing the orbital member to the first connector part; and
    g. a second retaining member rotatable securing the orbital member to the second connector part;
    h. wherein each of the first and second retaining members includes:
        i. an annular load ring defining a first interior curved surface in contact with and complementary to a curvature of the spherical segment, the annular load ring defining an outer end surface extending at an oblique angle to a longitudinal axis of the annular load ring; and
        ii. an annular lock ring securing the load ring to the first connector part, the annular lock ring having a second interior surface in flush surface contact with the annular load ring end surface;

ii. wherein the annular load ring and the annular lock ring contact the orbital member on a first side of a first plane and the seal member contacts the orbital member on a second side of the first plane, wherein the first plane extends both orthogonally to the seal member longitudinal axis and through a geometric center of the orbital member first or second spherical segment.

8. The orbital coupling arrangement of claim 7, wherein the orbital member is a unitarily formed component.

9. The orbital coupling arrangement of claim 7, wherein one or both of the annular load ring and annular lock ring of the retaining member is a polymeric material.

10. The orbital coupling arrangement of claim 7, wherein the first and second retaining members are respectively threaded onto the first and second connector parts.

11. The orbital coupling arrangement of claim 7, comprising:

wherein the first connector part can rotate relative to the second connector part at a first angle between a longitudinal axis of the first connector part and a longitudinal axis of the second connector part, the first angle being at least 80 degrees.

12. The orbital coupling arrangement of claim 11, wherein the orbital member can rotate relative to the first connector part at a second angle between a longitudinal axis of the orbital member and the longitudinal axis of the first connector part, the second angle being at least 40 degrees.

13. The orbital coupling arrangement of claim 11, wherein the orbital member can rotate relative to the first connector part at a second angle between a longitudinal axis of the orbital member and the longitudinal axis of the first connector part, the second angle being at least 40 degrees; and wherein the orbital member can rotate relative to the second connector part at a third angle between a longitudinal axis of the orbital member and the longitudinal axis of the second connector part, the third angle being at least 40 degrees.

* * * * *